United States Patent [19]

Allen

[11] 4,185,839

[45] Jan. 29, 1980

[54] PACKING GLAND FOR PUMP SHAFT SEAL

[76] Inventor: Clifford H. Allen, 13109 W. Chester Trail, Chesterland, Ohio 44026

[21] Appl. No.: 953,540

[22] Filed: Oct. 23, 1978

Related U.S. Application Data

[62] Division of Ser. No. 827,883, Aug. 26, 1977, Pat. No. 4,140,444.

[51] Int. Cl.$^2$ .............................................. F16J 15/16
[52] U.S. Cl. .................................................... 277/105
[58] Field of Search ............................... 277/102, 105

[56] References Cited

U.S. PATENT DOCUMENTS

| | | | |
|---|---|---|---|
| 1,034,696 | 8/1912 | Daniels et al. | 277/105 |
| 1,486,708 | 3/1924 | Wells | 277/105 |
| 2,534,530 | 12/1950 | Perry et al. | 277/105 |

FOREIGN PATENT DOCUMENTS

| | | | |
|---|---|---|---|
| 375251 | 5/1923 | Fed. Rep. of Germany | 277/105 |
| 34154 | 5/1905 | Switzerland | 277/105 |
| 17989 | of 1907 | United Kingdom | 277/105 |

*Primary Examiner*—Robert I. Smith
*Attorney, Agent, or Firm*—Pearne, Gordon, Sessions, McCoy and Granger

[57] ABSTRACT

A progressing cavity, positive displacement rotary pump for liquid or semiliquid material, having a specially designed flexible coupling shaft for connecting a drive shaft to an orbital rotor. The pump components include a tubular stator with an interior helical surface and a hollow tubular orbital rotor within the stator operably connected to the shaft and having an exterior helical surface. The rotor and stator define therebetween sealed pumping cavities that advance axially as the rotor rotates and orbits within the stator. The rotor has a tapered socket with a polygonal transverse cross-section (e.g., pyramid-shaped) at its outer end. The rotor is coupled to the rotor drive shaft by the flexible coupling shaft that extends through the hollow rotor and that has an enlarged tapered head formed to fit tightly in the socket and be retained therein by a threaded fastener. The opposite end of the coupling shaft is connected to the drive shaft outside of the rotor. The coupling shaft flexes to accommodate orbital movement of the rotor during operation of the pump. Also, a unique seal retainer is used to locate a packing-gland-type shaft seal for the drive shaft. The retainer faciliates removal and replacement of the seal components.

2 Claims, 10 Drawing Figures

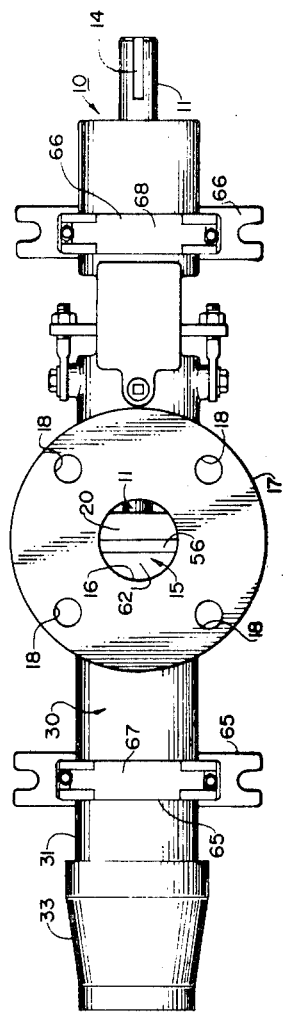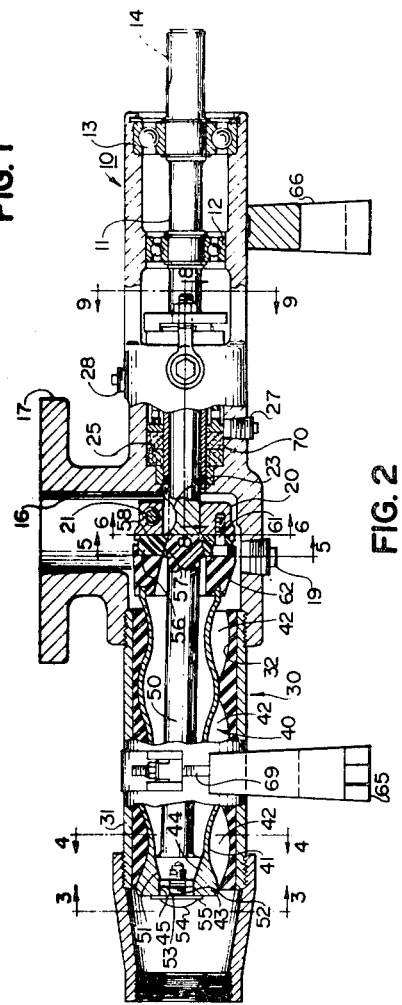
FIG. 1
FIG. 2

PACKING GLAND FOR PUMP SHAFT SEAL

This is a division of application Ser. No. 827,883 filed Aug. 26, 1977 and now U.S. Pat. No. 4,140,444.

BACKGROUND OF THE INVENTION

This invention relates to progressing-cavity-type positive displacement helical pumps for handling liquid and comminuted material, such as the progressing cavity helical pump of my U.S. Pat. Nos. 3,512,904 and 3,938,744. More particularly, the invention relates to an improved flexible coupling shaft of the type that extends through a helical pump rotor of tubular form and flexes therein for coupling the pump rotor to a rotary drive shaft to accommodate orbital movement of the rotor during rotation thereof.

Progressing-cavity-type positive displacement rotary devices of the general class that includes the devices disclosed in my U.S. Pat. Nos. 3,512,904 and 3,938,744 (hereinafter referred to as "Allen" devices or pumps) have a rotor with an exterior helical surface tht engages the surrounding interior helical surface of the stator, the rotor surface having one more thread than the stator surface and a lead twice that of the stator surface. Thus, the stator surface and the rotor surface define therebetween sealed pumping cavities that are axially advanced as the rotor rotates and at the same time orbits in the same direction at two or more times the rate of its rotation. For a more complete description of Allen pumps of this type, reference is made to my aforesaid U.S. Pat. No. 3,512,904.

This class of rotary helical devices differs from the well-known Moineau-type devices as disclosed, for example, in U.S. Pat. No. 1,892,217. In the Moineau-type device, the helical rotor orbits in the reverse direction relative to its rotation and the helical stator surface has one more thread than the helical rotor. The coupling between the Moineau rotor and drive shaft must utilize a universal connection to accommodate the orbital motion of the rotor, the orbital speed being equal to the speed of rotation. Various types of universal connections or couplings have been utilized, including conventional universal joints, long flexible shafts, etc.

Typical examples of such couplings utilizing flexible shafts, or the like, are described in U.S. Pat. Nos. 2,028,407; 2,456,227; and 3,612,734 and in British Pat. No. 1,379,907. The devices shown use flexible metal shafts or metal cables. The flexing produces substantial stresses in the metal shafts or cables and the devices are prone to failure due to fatigue.

Among the many applications for Allen pumps are certain uses where relatively small units are used to pump slurries, such as sludge from dust separators, and thick, viscuous industrial chemical products. It is desirable that these pump units be of compact, easily maintained construction and that replacement of parts, such as a worn rotor or stator, be easily accomplished.

One advantageous form of flexible coupling is disclosed in my U.S. Pat. No. 3,938,744 wherein the pump is designed primarily for use in the pumping of sewage. The same drive shaft that drives the pump rotor is used to drive a grinding unit that operates simultaneously with the pump. In that application, the shaft extends through a hollow rotor and the coupling between the rotor and the shaft is accomplished by a flexible sleeve positioned within the rotor and surrounding the drive shaft. The flexible sleeve is connected at one end to the shaft and at the opposite end to the rotor. That construction is especially adapted to applications where the drive shaft extends completely through the rotor, whereas, the present invention deals with applications wherein there is no need for the drive shaft to extend through the rotor.

More specifically, the present invention is concerned with the flexible connection or coupling between the rotary drive shaft and a generally hollow orbital rotor of the type shown in my U.S. Pat. No. 3,938,744, the required flexibility being provided by a flexible coupling shaft with at least a portion of its length being adapted to flex in the space within the hollow rotor. The connection of the flexible shaft to the rotor can be accomplished in several conventional ways, although these usually require relatively large components, such as hubs, flanges, etc., which require considerable space relative to the rotor and shaft. While sufficient space may be available in larger pumps, there is frequently insufficient space in the case of smaller, lower capacity pumps. Also, the smaller the pump, the more difficult and time-consuming the assembly of the connection between the hollow rotor and flexible shaft becomes.

Another related problem in the field of liquid pumps generally, as well as progressing-cavity-type pumps of the type described above, is that of preventing leakage of the material being pumped along the drive shaft to the shaft bearings. Generally, this is done by providing a packing gland between an outer portion of the shaft and a surrounding bore in the housing. This packing must not only be adequately retained in its desired position, but must be periodically replaced. In the past, the removal and replacement has required substantial disassembly of the pump and has been a burdensome, time-consuming procedure.

The device of the present invention satisfies the requirements and difficulties indicated above and affords other features and advantages heretofore not obtainable.

SUMMARY OF THE INVENTION

It is among the objects of the present invention to provide a positive displacement, helical pumping mechanism (e.g., Allen pump) with an improved means for coupling a hollow orbital rotor to a rotary drive shaft.

Another object of the invention is to provide a coupling between a rotary drive shaft and a hollow orbital rotor for a pump of the type described wherein a flexible connection is made entirely within the hollow orbital rotor.

Still another object is to provide an improved shaft seal construction for a pump of the type described, wherein the seal components may be easily removed and replaced without substantial disassembly of the pump.

These and other objects are accomplished by the novel pump construction of the invention which comprises a progressing cavity, positive displacement rotary pump, including a housing, a rotary drive shaft journaled in the housing, drive means for the shaft and a generally tubular stator coaxial with the rotary shaft and having a helically formed interior surface. Located within the stator is a tubular hollow orbital rotor having a helically formed exterior surface engaging the interior surface of the stator to define therewith sealed pumping cavities that progress axially when the rotor is simultaneously rotated and orbited within the stator. The rotor has at its outer, downstream end, a coupling socket, including an axially extending seat portion of polygonal transverse cross-section that tapers inwardly toward the outer end.

The flexible coupling shaft extends through the rotor and is connected at its outer end to the outer end of the rotor and at its inner end to the rotary drive shaft. The coupling shaft has an enlarged head at its outer end of non-circular transverse cross-section that tapers inwardly toward the outer end to mate with the tapered seat in the rotor. A suitable fastening means secures the head in the seat to couple the flexible shaft to the rotor so that the shaft flexes to accommodate orbital movement of the rotor during operation of the pump.

The flexible coupling shaft is preferably formed of an engineering grade plastic, such as an acetal homopolymer or an acetal copolymer. "DELRIN" and "CELCON" are commercial trademarks for these materials, respectively.

According to another aspect of the pump construction, the rotary drive shaft for the unit is provided with a shaft seal retainer that extends through opposite sides of the housing and bears against the end of a packing-gland-type seal assembly at three bearing points to urge the seal assembly tightly into its operating position. The bearing points are located on a crescent-shaped portion of the retainer that fits around the drive shaft, but is easily laterally removed therefrom. The retainer is tightly clamped to the housing with pressure adjusting screws readily accessible from outside the housing. Accordingly, the retainer is easily removed to facilitate removal and replacement of the seal components.

BRIEF DESCRIPTION OF THE DRAWINGS

FIG. 1 is a plan view of an Allen-type pump assembly embodying the invention;

FIG. 2 is a side elevation with parts broken away and shown in section for the purpose of illustration;

DESCRIPTION OF THE PREFERRED EMBODIMENT

Figure 3:
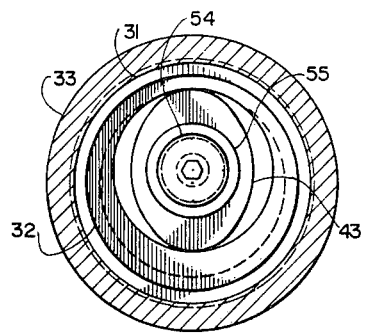
FIG. 3 is a cross-sectional view taken on line 3—3 of FIG. 2.

For the purpose of illustration, the invention will be described herein in connection with its use in a progressing cavity Allen-type pump designed for pumping liquid and liquid slurries. The pump is adapted to receive the liquid to be pumped from an inlet pipe (not shown) with a suitable flange fitting and to be exhausted through an outlet pipe (not shown) connected to the front end of the pump. The pump comprises a housing 10 in the form of a steel casting that serves as a bearing mount for a rotary drive shaft 11. The shaft 11 is journaled in a conventional manner in a pair of bearing assemblies 12 and 13 supported in the rearward end of the housing 10 as indicated in FIG. 2. The outer, or rearward, end of the shaft 11 has a key slot 14 that serves to connect the shaft to a power source, such as an electric motor (not shown) for driving the pump.

The housing 10 also defines an inlet cavity 15 into which the forward end of the rotary drive shaft 11 extends, and an inlet throat 16 communicating with the inlet cavity 15. The inlet throat 16 is defined, in part, by an inlet flange 17 with four symmetrically spaced bolt holes, as indicated in FIG. 1, used to secure an inlet pipe to the housing 10. At the bottom of the inlet cavity 15 is a pipe plug 19 that may be used for draining and cleaning the pump.

Figure 6:
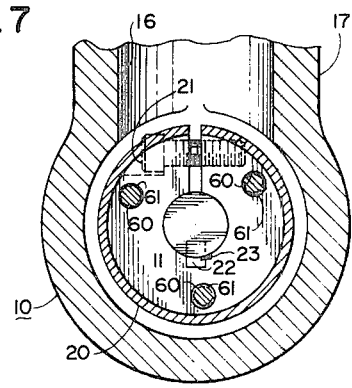
FIG. 6 is a cross-sectional view taken on the line 6—6 of FIG. 2.

A drive flange 20 is keyed to the inner end of the rotary drive shaft 11, as shown in FIG. 6. The drive flange 20 is in the form of a split ring with a key slot 22 that cooperates with a Woodruff key 23 to key the drive flange 20 to the end of the shaft 11. A threaded tangential bore is formed in the drive flange 20 perpendicular to the radial split and a socket head cap screw 21 is threaded into the drive flange 20 to tighten the drive flange 20 down on the shaft 11 once it has been positioned at the desired location.

Intermediate the ends of the drive shaft 11 is a seal chamber 25 defined by the housing 10 and adapted to receive a conventional shaft seal, as will be described in detail below. Pipe plugs 27 and 28 are threaded into the housing at the top and bottom of the seal chamber 25 to permit flushing and lubrication of the seal.

A stator assembly 30 with a rotor assembly 40 therein is located at the forward end of the housing 10. The stator assembly 30 includes a cylindrical casing 31 threaded into an opening in the housing 10 communicating with the inlet cavity 15. Threaded onto the opposite end of the cylindrical casing 31 is an outlet reducer 33 adapted to be connected to an outlet pipe at its outer end.

A generally tubular stator 32, preferably formed of rubber or other resilient material, is bonded to or press-fitted into the cylindrical casing 31. The stator 32 may be a molded unitary element or may be formed of two molded halves. The interior surface of the stator 32 defines helical threads that cooperate with the rotor in a manner described below.

Figure 4:
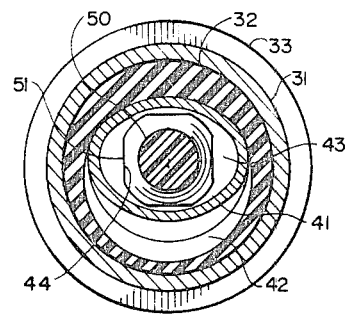
FIG. 4 is a cross-sectional view taken on the line 4—4 of FIG. 2.
Figure 7:
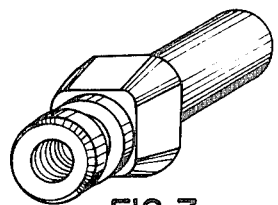
FIG. 7 is a fragmentary perspective view of a flexible coupling shaft embodying the invention.
Figure 5:
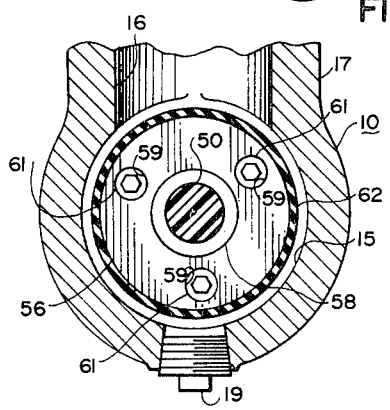
FIG. 5 is a cross-sectional view taken on the line 5—5 of FIG. 2.

A rotor 41 preferably formed of stainless steel by investment casting is located within the stator. The rotor 41 has an exterior helical surface with a generally eliptical form, as shown in transverse cross-section (FIG. 4). The helical rotor surface has one more thread (i.e., two threads in this instance) than the helical stator surface (the stator surface having one thread in this instance), which it engages to define sealed pumping cavities 42. Also, the threads have a lead that is equal to the number of threads in the rotor 41 times the lead of the helical surface of the stator 32. As the rotor 41 rotates, its axis translates in an orbit circle about the axis of the pump shaft 11 and the pumping cavities 42 are axially advanced. This function is described in my aforesaid U.S. Pat. No. 3,512,904.

The rotor 41 is of hollow construction with a wall of generally uniform thickness along most of its axial length. The forward end portion 43 of the rotor 41, however, is considerably thicker and of a more solid construction. The end 43 defines a tapered, pyramid-shaped seat 44 of a generally polygonal transverse cross-section, that tapers inwardly toward the outer end. An axial bore 45 extends axially from the outer face of the rotor into the seat.

In accordance with the invention, the rotor 41 is coupled to the rotary drive shaft 11 by a flexible coupling shaft 50 molded of a strong engineering grade plastic, such as an acetal homopolymer or copolymer. The shaft 50 is adapted to flex as necessary in order to accommodate the orbital movement of the rotor 41 in an orbit circle about the axis of the shaft 11. As indicated, the flexible coupling shaft 50 is located generally within the hollow rotor 41.

Referring to FIG. 2, the shaft 50 has an enlarged forward head 51 with four flat, tapered surfaces (i.e., pyramid-shaped) formed to mate with the seat 44 in the forward end of the rotor 40. The foremost portion of the head 51 is of cylindrical cross-section and fits the bore 45 in the rotor 41. An annular groove 52 surrounding the cylindrical portion is adapted to receive an "O" ring seal 53.

In order to secure the coupling shaft 50 to the rotor, a socket-hand machine screw 54 that bears against a washer 55 is threaded into a threaded bore in the end of the head 51.

The opposite end of the shaft 50 is provided with a coupling flange 56 that is initially formed separately and provided with a frusto-conical tapered opening 57 adapted to mate with a corresponding taper 58 formed on the end of the shaft 50. The flange 56 is secured to the shaft 50 by spin welding according to spin welding practices for engineering plastics well-known to those skilled in the art. The flange has three axially extending holes adapted to mate with corresponding holes in the drive flange 20 which is secured to drive shaft 11. Thus, the shaft 50 can be secured to the drive flange 20 with socket-head cap screws 61, and thus connected to the drive shaft 11. Preferably, the shaft 50 is formed from a length of cylindrical stock of a diameter approximately equal to the diameter of the head portion 51. The stock is turned down to the desired diameter along the major portion of the coupling shaft length to provide the desired thickness and flexibility. The end portions of the shaft 50 adjacent the head portion 51 and the tapered portion 58 are flared outward to provide increased strength at the locations that are subjected to the greatest stress due to the flexing of the shaft 50 during pump operation.

Entry of liquid to the interior of the rotor is prevented by a Neoprene boot seal 62 that is tightly gripped between the flange 56 and the inner end of the rotor 41. The seal is provided with an annular slot 63 in its outer end that receives the circular end edge of the rotor 41.

The rotor and stator geometry and the mathematical relationships involved in their operation are described in detail in my U.S. Pat. No. 3,512,904, which is made a part hereof and incorporated by reference herein.

The stator 32 may be molded, for example, of "BUNA-N" rubber in a multiple cavity mold and clamped in place at assembly, or it may be more practical to bond the stator directly to the interior surface of the sleeve 31 at the time of molding of the stator. The rubber material, of which the stator 32 is formed, provides a semipositive characteristic for the unit, so that it is capable of being "dead-ended" (i.e., blocked at the outlet end) without risk of bursting a line or destroying the pump. This is an automatic safety feature in case of a severely blocked discharge. More importantly, the elastomeric stator permits a tight sealing fit to the rotor for maximum volumetric efficiency and flexes to permit solid particles to pass through the seal lines which separate one cavity from another.

Figures 8, 9, 10:
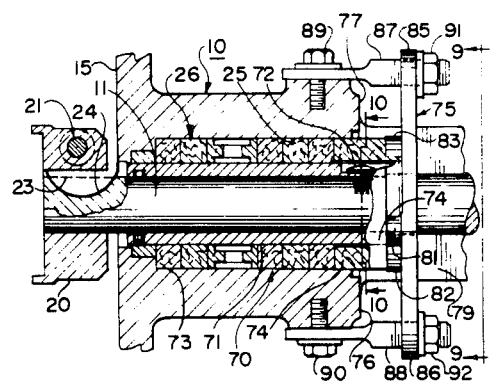
FIG. 8 is a fragmentary longitudinal sectional view on an enlarged scale taken on the line 8—8 of FIG. 2 and with parts broken away for the purpose of illustration.
FIG. 9 is a sectional view on an enlarged scale taken on the line 9—9 of FIG. 8.
FIG. 10 is a sectional view taken on the line 10—10 of FIG. 8.

In accordance with another aspect of the invention, the inlet cavity 15 of the housing 10 is sealed from the bearing units 12 and 13 for the shaft 11 by a shaft seal assembly 70 located in the seal chamber 25. (FIGS. 2, 8, 9 and 10). The shaft seal assembly 70 includes a wear sleeve 71, surrounding the shaft 11 and secured thereto, by a button head socket screw 72 (FIG. 10). Surrounding the wear sleeve 71 are a plurality of conventional split packing elements positioned against one another to form a packing seal with an annular liquid cavity in the central portion. A conventional split gland sleeve 74 located at the rearward end of the seal holds the elements 73 in position. Liquid is supplied to the packing gland through an upper tapped opening closed by the pipe plug 28, and drained off through a lower tapped opening closed by the pipe plug 27. The gland sleeve 74 and packing elements 73 are all positioned and held in place by a packing gland 75 (FIGS. 8 and 9) that is easily removed for disassembly and that is positioned and removed through side openings 76 and 77 in the housing 10 located between an upper connecting span 78 and a lower connecting span 79 extending between the two openings 76 and 77. The packing gland 75 has a shape that permits it to fit around portions of the shaft 11, and yet be removed laterally without interference with the shaft 11.

As best seen in FIG. 9, the central portion of the packing gland 75 has a curved, crescent shape and supports three symmetrically spaced gland sleeve compression buttons 81, 82 and 83, which bear against the gland sleeve 74. Also, retainer 75 has two oppositely extending arms 85 and 86, which extend through the openings 76 and 77, and which are engaged by adjusting rods 87 and 88. The rods 87 and 88 have threaded stud portions that are engaged by adjusting nuts 91 and 92. The inner ends of the rods 87 and 88 are flattened and provided with a central opening for use in anchoring them with hexhead machine screws 89 and 90 to tapped holes in bosses formed on the sides of the housing 10.

With this construction, the shaft seal assembly 70 may be disassembled merely by removing the nuts 91 and 92 from the adjusting rods 87 and 88 and removing the packing gland 75 rearwardly off the ends of the stud portions of the rods 87 and 88, so that the packing gland may be moved laterally out of the housing 10. The split elements of the seal assembly may then be easily removed laterally from the shaft 11 through the openings 76 and 77 in the housing 10. The replacement of the packing seal elements and the repositioning of the packing gland 75 is accomplished merely by reversing the procedure just described.

The pump assembly is anchored to a suitable base by means of support saddles 65 and 66, located as shown in FIGS. 1 and 2, and straps 67 and 68 that are secured by nuts to threaded studs 69 on the support saddles 65 and 66.

With the construction shown, the pump is easily disassembled periodically for cleaning and replacement of parts. In order to remove the rotor assembly 40 from the stator 32, the outlet reducer 33 is unscrewed from the casing 31, the machine screw 54 is unscrewed from the flexible shaft 50, and the rotor assembly 40 is twisted forwardly out of the stator 32. Then the boot seal 62 is removed and the cap screws 61 connecting the flange 56 to the drive flange 20 are unscrewed to permit removal of the flexible shaft 50. These parts may be cleaned and reinserted, or else replaced, as desired. Alternately, the rotor 40, boot seal 62, flexible shaft 50, and drive flange 20 can be removed as an assembly by loosening the socket head cap screw 21 and sliding the assembly off the drive shaft 11.

Typical dimensions for the helical positive displacement pump illustrated herein are given in TABLE I below.

TABLE I

| Pump Dimension | (Inches) |
|---|---|
| Eccentricity | .1 |
| Cavity length | 4.00 |
| Rotor major dia. | 1.56 |
| Rotor minor dia. | 1.16 |
| Rotor form length | 5.25 |
| Stator major inside dia. | 1.75 |
| Stator minor inside dia. | 1.35 |
| Stator outside dia. | 2.25 |
| Stator length | 5.00 |
| Stator/cavity length ratio | 1.25 |

A pump designed to these dimensions will have a displacement of 17¼ gallons per minute at a shaft speed of 1725 rpm.

While the invention has been shown and described with respect to a specific embodiment thereof, this is intended for the purpose of illustration rather than limitation and other modifications and variations of the specific embodiment herein shown and described will be apparent to those skilled in the art, all within the intended spirit and scope of the invention. Accordingly, the patent is not to be limited in scope and effect to the specific embodiment herein shown and described, nor in ay other way that is inconsistent with the extent to which the progress in the art has been advanced by the invention.

I claim:

1. In a shaft seal assembly for use in association with a rotary shaft within a housing therefor, and adapted for mounting around a portion of the shaft to provide a seal between forward and rearward spaces around the shaft, said shaft seal assembly including a plurality of packing seal elements positioned around said shaft portion adjacent one another between a forward seal element and a rearward seal element, the improvement which comprises:

means for axially retaining said forward seal element, means defining a pair of opposed openings in said housing communicating with said rearward space, a seal gland adapted to be moved laterally through one of said openings to and from a seal retaining position and including a central crescent-shaped portion adapted to be laterally removably positioned partially around said shaft, a plurality of symmetrically spaced gland sleeve compression buttons on said central portion adapted to bear in an axial direction against said rearward seal element, and a pair of end portions located on opposite sides of said central portion and extending radially outward through said openings, and means outside of said housing and engageable with said end portions for removably securing said seal gland to said housing and for adjustably urging said seal gland in an axial direction for applying desired seal compression force against said rearward seal element.

2. A shaft seal assembly as defined in claim 1 wherein said gland has three gland sleeve compression buttons.

* * * * *